US006459410B1

(12) United States Patent
Pulsipher et al.

(10) Patent No.: US 6,459,410 B1
(45) Date of Patent: Oct. 1, 2002

(54) COMMUNICATION SYSTEM HAVING A ROTATING DIRECTIONAL ANTENNA

(75) Inventors: Dennis C. Pulsipher, Farmington; Robert A. Lindsay, Bountiful, both of UT (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 09/693,051

(22) Filed: Oct. 20, 2000

(51) Int. Cl.[7] .................................................. G01S 5/02
(52) U.S. Cl. ...................................................... 342/428
(58) Field of Search ................................ 342/428, 429, 342/359

(56) References Cited

U.S. PATENT DOCUMENTS 6,246,378 B1 * 6/2001 Benjauthrit ................ 343/839

* cited by examiner

*Primary Examiner*—Theodore M. Blum
(74) *Attorney, Agent, or Firm*—Perman & Green, LLP

(57) ABSTRACT

A signal transmission system comprising a transmitter, a rotating transmitting antenna connected to the transmitter, a receiver, and a receiving antenna connected to the receiver. A controller connected to the transmitter is adapted to control the transmitter based upon a location of the receiving antenna relative to the transmitting antenna. The controller is also adapted to limit a transmission of signals from the transmitter to when a predetermined beam pattern of the transmitting antenna is at least partially aligned with the receiving antenna.

21 Claims, 4 Drawing Sheets

COMMUNICATION SYSTEM HAVING A ROTATING DIRECTIONAL ANTENNA

BACKGROUND OF THE INVENTION

1. Field of the Invention

The present invention relates to communication systems and, more particularly, to a directional beam network.

2. Related Art

Communications in a directional beam network are generally carried out using a point-to-point directional antenna, possibly switched between receivers, or an omni-directional broadcast antenna. The location of a target antenna needs to be known so that the transmitting antenna can be moved and stopped at the target so that the transmission can take place.

SUMMARY OF THE INVENTION

The present invention is directed to, in a first aspect, a signal transmission system. In one embodiment, the system comprises a transmitter, a rotating transmitting antenna connected to the transmitter, a receiver, and a receiving antenna connected to the receiver. A controller connected to the transmitter is adapted to control the transmitter based upon a location of the receiving antenna relative to the transmitting antenna. The controller is also adapted to limit a transmission of signals from the transmitter to when a predetermined beam pattern of the transmitting antenna is at least partially aligned with the receiving antenna.

In another aspect, the present invention is directed to a method of transmitting signals from a source to a receiver. In one embodiment, the method comprises determining a location of an antenna of the receiver, and transmitting signals from a rotating directional transmitting antenna coupled to the source when a beam pattern of the rotating transmitting antenna at least partially aligns with the antenna of the receiver.

In a further aspect, the present invention is directed to a computer program product. In one embodiment, the computer program product comprises a computer useable medium having a computer readable code device embodied therein for causing a computer to cause a transmitter to transmit a signal to a receiver. The computer readable code device in the computer program product can comprise a computer readable program code device for causing a computer to determine a location of at least one receiver in a network of receivers and a computer readable program code device for causing a computer to cause a transmitter to transmit the signal to the receiver. The computer readable program code device can also be adapted to cause a computer to limit a transmission of the signal to the receiver to when a beam pattern of a rotating transmitting antenna is at least partially aligned with a receiving antenna of the receiver.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
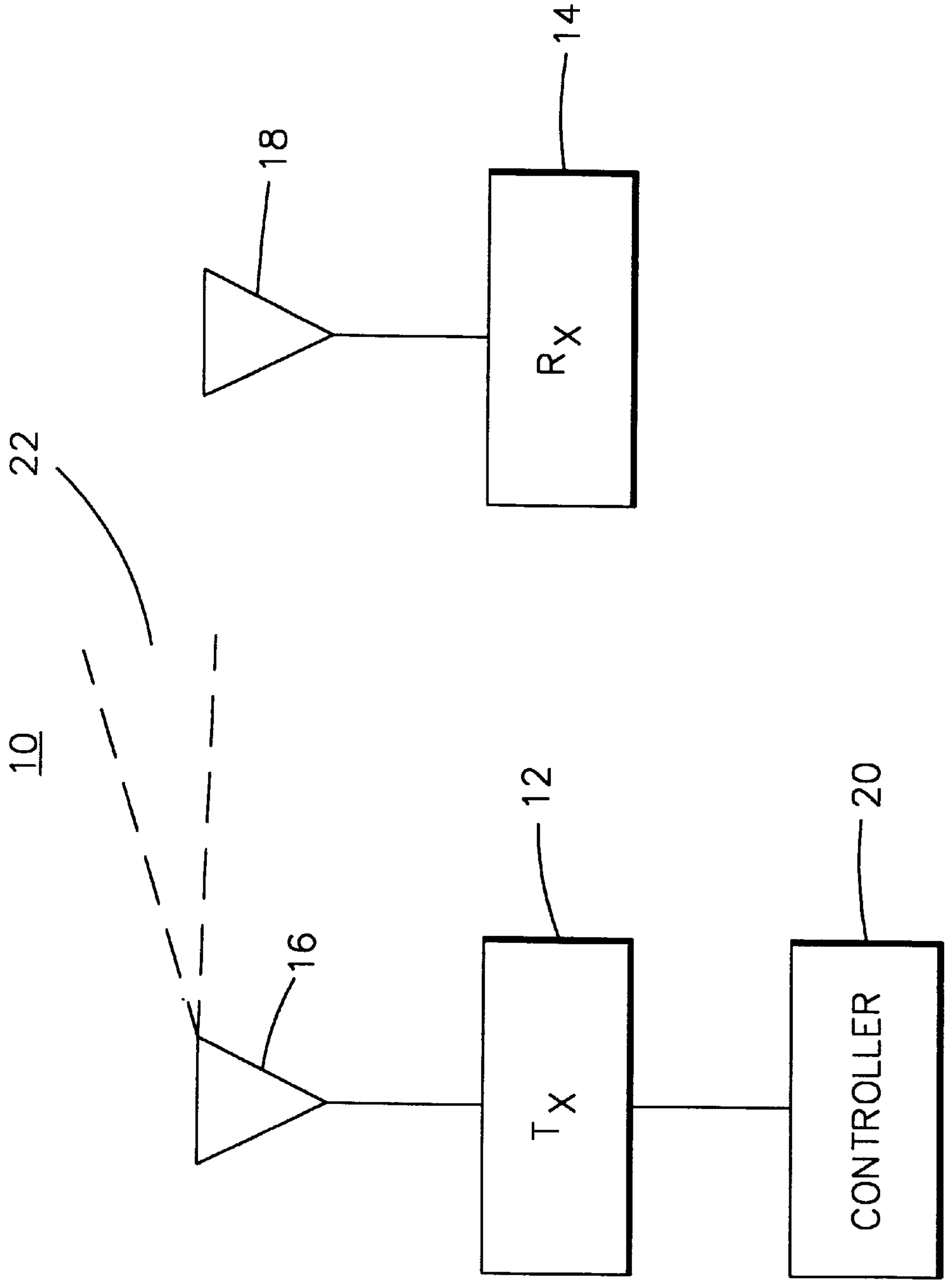
FIGS. 1 and 6 are block diagram of one embodiment of a communications system incorporating features of the present invention.

Referring to FIG. 1, there is shown a block diagram of a system 10 incorporating features of the present invention. Although the present invention will be described with reference to the embodiments shown in the drawings, it should be understood that the present invention could be embodied in many alternate forms of embodiments. In addition, any suitable size, shape or type of elements or materials could be used.

The system 10 generally comprises a transmitter 12, a receiver 14, and a controller 20. In alternate embodiments, the system 10 could include other suitable communication components and devices. As shown in FIG. 1, the transmitter 12 is generally coupled to a respective transmitting antenna 16. The transmitter 12 can include antenna 16, or be located near to or remotely from its antenna 16. The transmitter 12 can be coupled to the antenna 16 by any suitable means. For example the connection between a transmitter 12 and its antenna 16 can include for example, a hardwire connection or a wireless connection. Similarly, the receiver 14 can be coupled to a respective receiving antenna 18 by any suitable means, and the receiving antenna 18 can be part of, close to or remote from the receiver 14.

The system 10 can also include a controller 20, which in one embodiment can be coupled to the transmitter 12. The controller 20 is generally adapted to control the transmitter based upon a location of the receiving antenna 18 relative to the location of the transmitting antenna 16. It is a feature of the present invention to manage signals or data transmission from the transmitter 12 to the receiver 14 so that the data is transmitted substantially only a the desired recipient (receiving antenna 18) is aligned with the a beam pattern 22 of the transmitting antenna 16.

In one embodiment, the location of the receiving antenna 18, can be predetermined and stored in the controller 20. In alternate embodiments, the controller 20 may be adapted to determine a location of the receiving antenna 18. Although FIG. 1 shows only a single transmitter 12 and a single receiver 14, the system 10 could include a plurality of transmitters 12 and a plurality of receivers 14. For example, one or more transmitters 12 could each be adapted to communicate respectively with each of the plurality of receivers 14 as the beam pattern 22 of each transmitting antenna 16 for each transmitters 12 at least partially aligns with one of the receivers 14. The controller 20 could be adapted to obtain the location of the each of the receiving antenna 18 in the system 10 relative to each transmitting antenna 16.

The controller 20 can be further adapted to substantially limit the transmission of signals to a receiver 14 to when the receiving antenna 18 of a selected receiver 14 is at least partially aligned with a beam pattern or field of a transmitting antenna 12. It is a feature of the present invention to make efficient use of power in the system by delivering power to the transmitting antenna 16 when the transmitting antenna 16 is pointed at or near a receiving antenna 18. In one embodiment, the system 10 is generally adapted to manage the transmitted power in the system by delivering power to the transmitting antenna only when the desired receiver's antenna 18 is at least partially in the beam pattern 22 of the transmitting antenna 16. In this manner, the transmitting power in the system 10 is used efficiently and potential interference with other communication systems is minimized. Since transmission power is generally only required when the recipient is at least partially aligned with the beam pattern, transmission systems using the same frequency range do not necessarily interfere with each other and messages meant for only one receiver are generally not available to be heard by other receivers.

The signal or signals being transmitted can include any type of communication or data signals, and can include for example, analog and digital signals, or such other signals used in wireless networking. In one embodiment, the transmitted data can include the address of the intended destination of the data, and different pieces of information intended for delivery to different receivers. Some subsets of the data may be of a broadcast nature intended for delivery to multiple receivers. It is a feature of the present invention to deliver only the intended data to each receiver, and generally avoid re-transmitting the same data multiple times.

The transmitting antenna 16 generally comprises a rotating, directional antenna having a determinable beam pattern. In alternate embodiments, the antenna 16 can comprise any suitable directional antenna, such as for example, a high gain directional antenna. Generally, the transmitting antenna 16 can be adapted to rotate at a constant rate for signal or data transmission. In alternate embodiments, the antenna 16 can be adapted to rotate at a constant, but non-uniform spin rate that can be controlled, by for example, the controller 20. It is a feature of the present invention to transmit data to a desired recipient when the desired recipient is aligned with the beam pattern of the rotating transmitting antenna. The non-uniform spin rate could allow the rotating speed of the transmit antenna 16 to be slowed when a receiving antenna 18 is in the beam pattern or field of the transmitting antenna 16, and then speed up again over areas where nothing of network interest is in the beam pattern 22. This mode of operation of the rotating antenna 16 could be used to enhance data rates.

For example, in one embodiment of a system 10 incorporating features of the present invention, three receive nodes 18 are present and a transmit node 16 has a beam pattern of approximately 6 degrees. The percentage of time a transmission could occur in a single scan would be $3\times6/360$, or approximately 5 percent of the circular scan time for a constant rate spin. Generally, using a non-uniform spin rate, this transmission time could be increased by up to approximately 30 percent of the scan time.

The receiving antenna 18 can generally comprise a non-steerable antenna, such as for example an omni-directional antenna. In an alternate embodiment, the receiving antenna 18 can comprise any suitable antenna for receiving a signal or data transmission.

The receiver 14 can also include provisions for avoiding or handling data collisions from multiple node transmissions. The low probability of intercept ("LPI"), low probability of detection ("LPD") and anti-jamming ("AJ") capabilities of a system 10 are generally the same as those available for a switched directional beam network configuration.

The controller 20 can also include transmit control and data buffering. In one embodiment, the controller 20 can be adapted to provide a discovery and dynamic network mapping system to optimize the data transfer switching.

Generally, the system 10 allows directional communication between a transmitter 12 and each of a plurality of receivers 14, respectively, without requiring a precisely controlled antenna which has to be started, stopped and positioned quickly and accurately. The continuously rotating antenna 16 can transmit when the antenna aligns with receiving antenna 18. The transmitting antenna 16 can rotate freely and transmit energy when the antenna pattern happens to be aligned with a receiver 14 or the receiving antenna 18. The system 10 does not generally require complex mechanical positioning systems to allow for quick switching between multiple users, as might be seen in a directional point-to-point communication system. When compared to an omni-directional transmission system, advantages are seen, including that the system 10 can be expanded because additional transmission systems using the same frequency range do not necessarily interfere with each other and messages meant for only one receiver are not available to be heard by other receivers. A feature of the present invention is that the hardware complexity and antenna control software and hardware for the system are less than that required in, for example, a fully connected beam network or a switched beam network.

Figure 2:
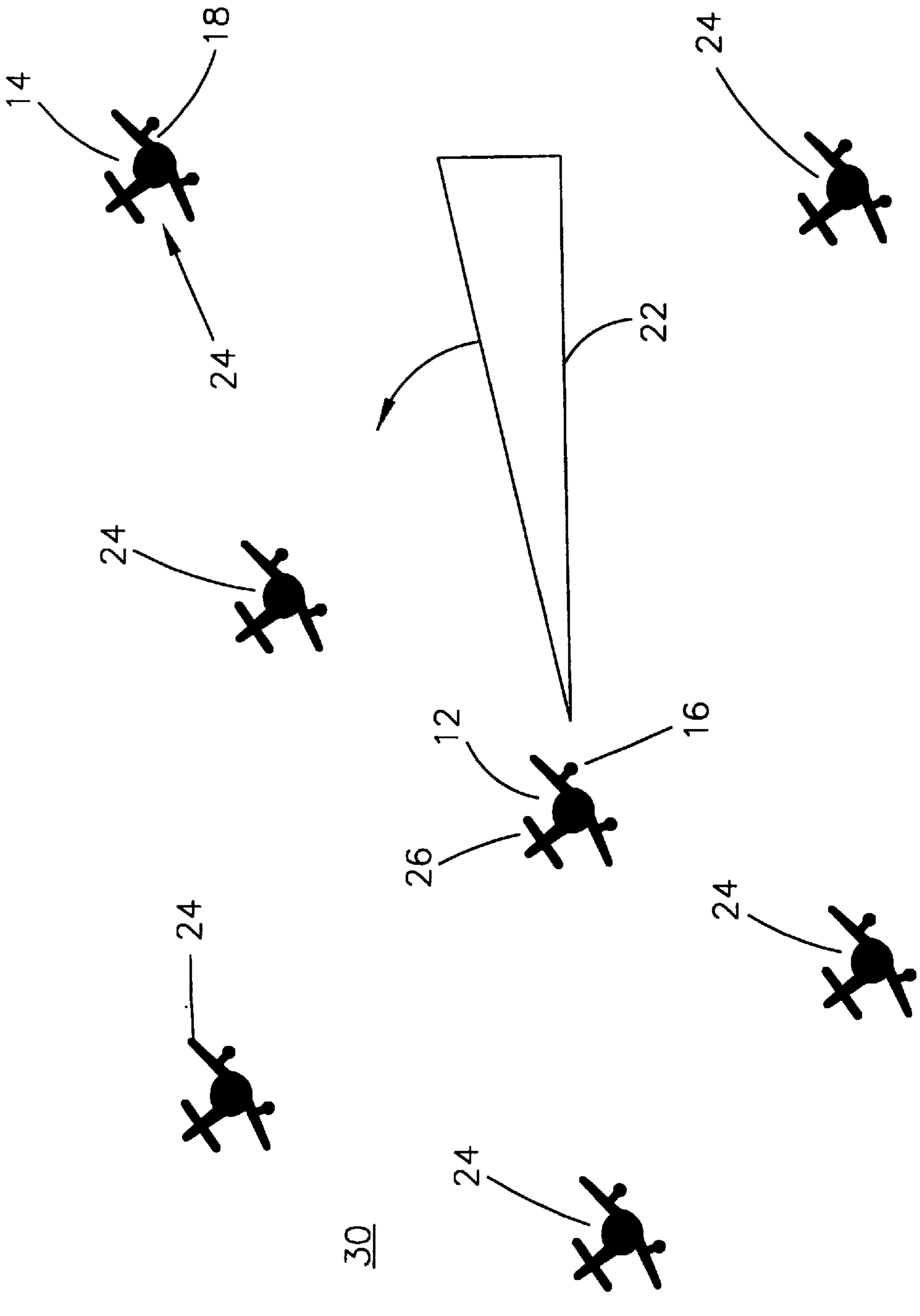
FIG. 2 is a representation of one embodiment of a point to point communications system incorporating features of the present invention.

In one embodiment, the system 10 comprises a rotational directional beam network 30 using a single directional antenna 16 at each transmitter site 26 or node which rotates a constant rate for data transmission as shown in FIG. 2. The receive antenna 18 of a given receiver 14 or node in the network 30 generally comprises a non steerable antenna. The link gain between a transmit node 16 and a receive node 14 is approximately the same as the link gain in a switched beam network.

As shown in FIG. 2, the rotational directional beam network 30 could comprise one or more transmit nodes or sources 26, which can comprise, for example, aircraft. The aircraft could be transmitting data or information to multiple target nodes or receiver sites 24. The receiver sites 24 could include for example, other aircraft. In alternate embodiments, the transmit nodes 26 and the target nodes 24 could comprise any suitable sites, such as for example mobile units, fixed stations or a spacecraft. In a constant rotating beam network 30, all network nodes 24 will be in the beam pattern 22 of the rotating antenna 26 for a portion of the scan. As the number of transmit 26 and receive 24 nodes grow, the system is scalable and the overall data transfer capacity can grow as well. Generally, however, for a portion of the rotational scan, the antenna 16 of the transmit node 26 is not pointing at a desired receive node 24. A data transfer interval in the network 30 would generally be less than that of a switched directional beam network. In one embodiment, the scanning antenna 16 of the transmit node 26 could rotate at significant rates thus minimizing data latency. On each scan, a handshake and link could be established. To establish acceptable rotational rates, a trade between time for establishing links, data transfer and data latency can be incorporated.

Generally, the time interval available for data transmission to a given node 14 is fixed for each rotation of the antenna 16. The network bandwidth capacity can be a function of the antenna 16 beamwidth, the registration and synchronization time, the rotational rate and the number of nodes in the network 30. In order to minimize latency while providing significant throughput, also described as using a large fraction of the rotational time dwelling on target nodes, a topology manager, which could be a function of controller 20, could designate a limited set of backbone node targets as target nodes for each revolution.

Figure 3:
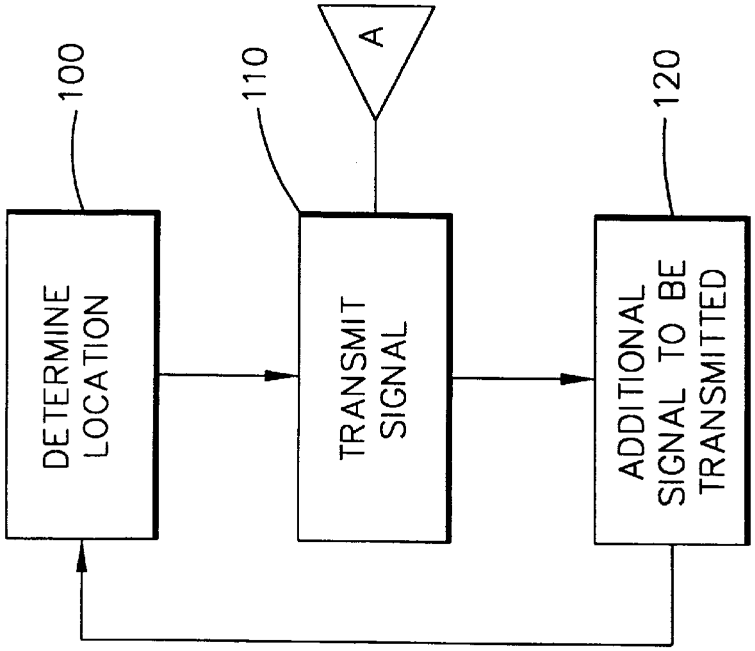
FIG. 3 is a flowchart of one embodiment of a communications method incorporating features of the present invention.

Generally, a method incorporating features of the present invention generally comprises determining 100 a location of a receiving antenna 18 as shown in FIG. 3. The location of the receiving antenna 18 could be known and preprogrammed, or acquired by the controller 20 of the system 10. In an alternate embodiment, the location of a receiving antenna 18 could be determined by any suitable means. Using the location of a receiving antenna 18, the controller 20 can initiate 110 the transmission of the signal or information to a selected receiver as the rotating beam pattern at least partially aligns with the receiving antenna 18. The method may also include determining 120 if additional signals are to be transmitted to other receivers 14 in the network, and looping back to block 100 from block 110.

Figure 5:
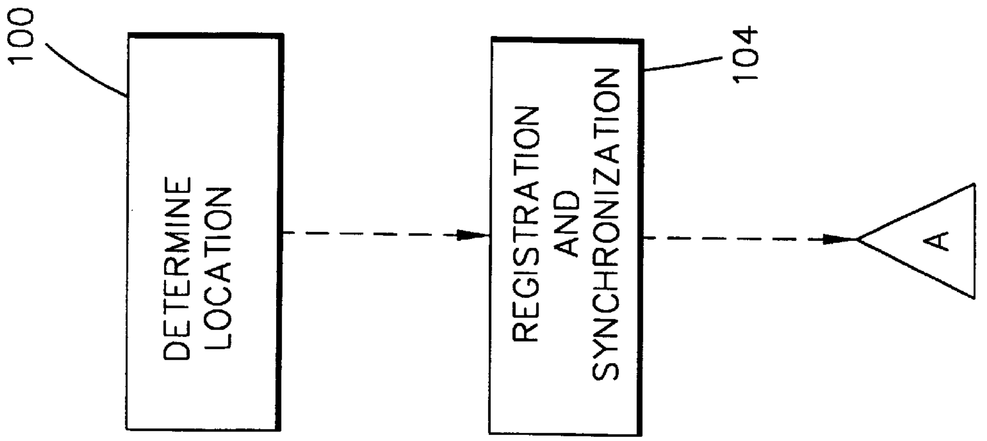
FIG. 5 is a flowchart of one embodiment of a communications method incorporating features of the present invention.
Figure 4:
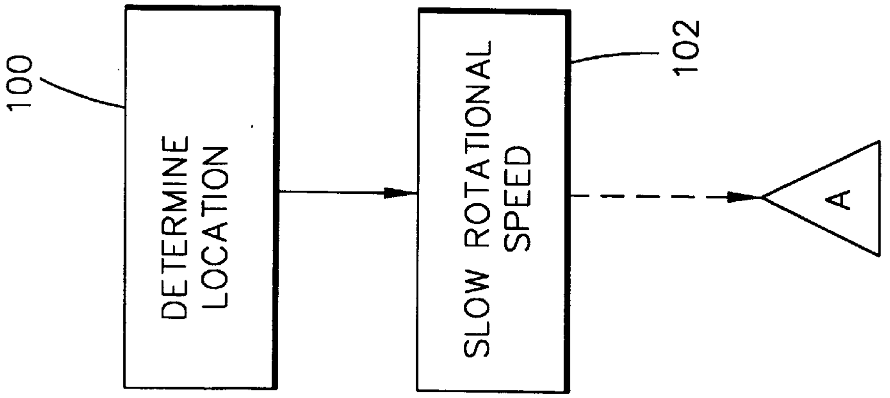
FIG. 4 is a flowchart of one embodiment of a communications method incorporating features of the present invention.

In one embodiment, prior to the step of transmitting, the method may include slowing 102 a rotational rate of the transmitting antenna as the beam pattern at least partially aligns with the receiving antenna 18 as shown in FIG. 4. The method can also include, prior to the step of transmitting, initiating 104 a registration and synchronization process to establish a link between a transmit source 12 and a receiver 14 when the beam pattern is at least partially aligned with the receiving antenna 18 as the transmitting antenna 16 rotates as shown in FIG. 5. The data transfer between the transmit source 12 and the receiver 14 could then take place during the remainder of the receiving antenna's 18 contact with the transmit antenna's 16 beam pattern. A similar process can occur as a rotating beam 22 encounters each target node 24 in the network 30 as shown in FIG. 2. After a 360-degree sweep, the data transmission process could repeat for the network system 30.

Figure 6:
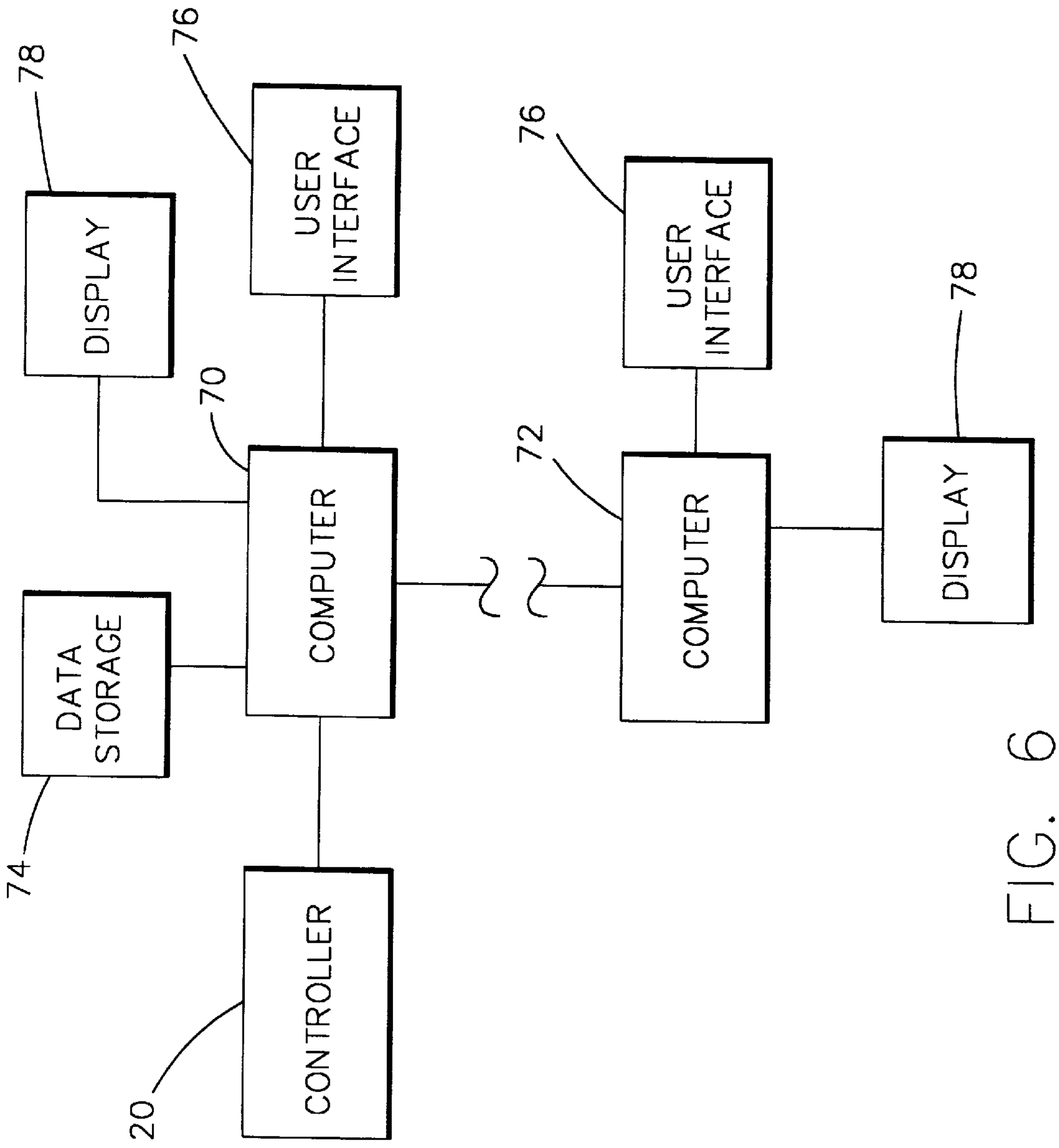

The present invention may also include software and computer programs incorporating the process steps and instructions described above that are executed by one or more computers. FIG. 6 is a block diagram of one embodiment of a typical apparatus incorporating features of the present invention that may be used to practice the present invention. As shown, a computer system 70 may be a stand-alone computer or linked to another computer system 72, such that the computers 70 and 72 are capable of sending information to each other and receiving information from each other. Computer 70 could include controller 20, or in an alternate embodiment, controller 20 could be linked or connected to computer 70. In one embodiment, computer system 72 could include a server computer adapted to communicate with a network, such as for example, the Internet. Computer systems 70 and 72 can be linked together in any conventional manner including a modem, hard wire connection, data link or fiber optic link. Generally, information can be made available to both computer systems 70 and 72 using a communication protocol typically sent over a communication channel 78 such as the Internet, or through a dial-up connection on an ISDN line. Computers 70 and 72 are generally adapted to utilize program storage devices embodying machine readable program source code which is adapted to cause the computers 70 and 72 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips. The present invention may also comprise an article of manufacture comprising a computer useable medium having computer readable program code means embodied therein.

Computer systems 70 and 72 may also include a microprocessor for executing stored programs. Computer 70 may include a data storage device 74 on its program storage device for the storage of information and data. The computer program or software incorporating the processes and method steps incorporating features of the present invention may be stored in one or more computers 70 and 72 on an otherwise conventional program storage device. In one embodiment, computers 70 and 72 may include a user interface 76, and a display interface 78 from which features of the present invention can be accessed. The user interface 76 and the display interface 78 can be adapted to allow the input of queries and commands to the system 10, as well as present the results of the commands and queries.

The system 10 can use knowledge of the various receiver locations and current antenna coverage, coupled with a rotating directional transmitting antenna and an omnidirectional receiving antenna, along with power management to perform point-to-point communications from one source to multiple receivers. Since the system preferably only transmits when the beam pattern is at least partially aligned with a receiving antenna, interference with other communications systems is minimized, and transmission systems using the same frequency range do not necessarily interfere with each other. Messages meant for only one receiver are generally not available to be heard by other receivers. Thus, the system 10 provides the noise immunity, privacy and interference characteristics and data rate of a directional system, without requiring a precisely controlled transmitting antenna or a complex mechanical positioning system.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A signal transmission system comprising:

a transmitter;

a continuously rotating transmitting antenna connected to the transmitter;

a receiver;

a receiving antenna connected to the receiver; and a controller connected to the transmitter, the controller being adapted to determine when a beam of the transmitting antenna is at least partially aligned with the receiving antenna during a scan and limit a transmission of signals from the transmitter to the receiving antenna to when the transmitting antenna is at least partially aligned with the receiving antenna.

2. The system of claim 1 wherein the rotating antenna is a directional antenna.

3. The system of claim 1 wherein the rotating antenna is adapted to rotate at a continuous rate.

4. The system of claim 1 wherein the rotating antenna is adapted to rotate at a non-uniform spin rate.

5. The system of claim 1 wherein the controller is further adapted to slow a rotating speed of the transmitting antenna as the beam pattern is at least partially aligned with the receiving antenna.

6. The system of claim 5 wherein the controller is further adapted to increase the rotational speed of the rotating antenna when the beam pattern at least partially passes by the receiving antenna.

7. The system of claim 1 wherein the receiving antenna is a non-steerable antenna.

8. The system of claim 1 wherein the receiving antenna is an omni-directional antenna.

9. The system of claim 1 wherein the controller is further adapted to initiate a registration and a synchronization process to establish a link between the transmitter and the receiver as the beam pattern is at least partially aligned with the receiving antenna.

10. The system of claim 9 wherein the controller is adapted to transfer data across the link.

11. The system of claim 1 wherein the controller is further adapted to control the transmission of a different predetermined signal to each of a plurality of receiving antennas that the rotating transmitting antenna encounters during a 360° sweep of the rotating antenna.

12. A method of transmitting signals from a source to a receiver comprising the steps of:

determining a location of an antenna of the receiver, the antenna of the receiver comprising a non-steerable antenna;

continuously rotating a directional transmitting antenna without tracking the receiver antenna; and transmitting signals from the rotating directional transmitting antenna coupled to the source when a beam pattern of the rotating transmitting antenna at least partially aligns with the antenna of the receiver during a sweep of the transmitting antenna.

13. The method of claim 12 wherein the step of transmitting from a rotating directional antenna comprises the step of transmitting from a continuously rotating antenna.

14. The method of claim 12 wherein the step of transmitting further includes the step of limiting transmission of the signals to the receiver from the transmitting antenna to substantially only when the beam pattern at least partially aligns with the antenna of the receiver.

15. The method of claim 12 further comprising the step, prior to the step of transmitting, of slowing a rotational speed of the rotating transmitting antenna when the beam pattern at least partially aligns with the antenna of the receiver.

16. The method of claim 15 further comprising the step, after the step of transmitting, of increasing the rotational speed of the rotating antenna after the beam pattern at least partially passes by the receiving antenna.

17. The method of claim 12, further comprising the step, prior to the step of transmitting, of initiating a registration and a synchronization process to establish a link between the transmitter and the receiver as the beam pattern at least partially aligns with the receiving antenna.

18. The method of claim 12 further comprising repeating the steps of:

determining a location of an antenna of the receiver; and transmitting signals from a rotating directional transmitting antenna coupled to the source when a beam pattern of the rotating transmitting antenna at least partially aligns with the antenna of the receiver;

for each of a plurality of receiving antennas encountered by the transmitting antenna during a 360° sweep of the transmitting antenna, wherein a different signal is transmitted to each of the receivers.

19. A computer program product comprising:

a computer useable medium having a computer readable code device embodied therein for causing a computer to cause a transmitter to transmit a signal to a receiver, the computer readable code device in the computer program product comprising:

a computer readable program code device for causing a computer to determine a location of at least one receiver in a network of receivers;

a computer readable program code device for causing a computer to cause a transmitter to transmit the signal to the receiver when a beam pattern of a continuously rotating transmitting antenna is at least partially aligned with a receiving antenna of the receiver.

20. The computer program product of claim 19 further comprising a computer readable program code device for causing a computer to slow a rotational speed of the transmitting antenna as the beam pattern at least partially aligns with the receiving antenna.

21. The computer program product of claim 19 further comprising a computer readable program code device for causing a computer to establish a link between the transmitter and the receiver as the beam pattern is at least partially aligned with the receiving antenna.

* * * * *